Patented Mar. 20, 1951

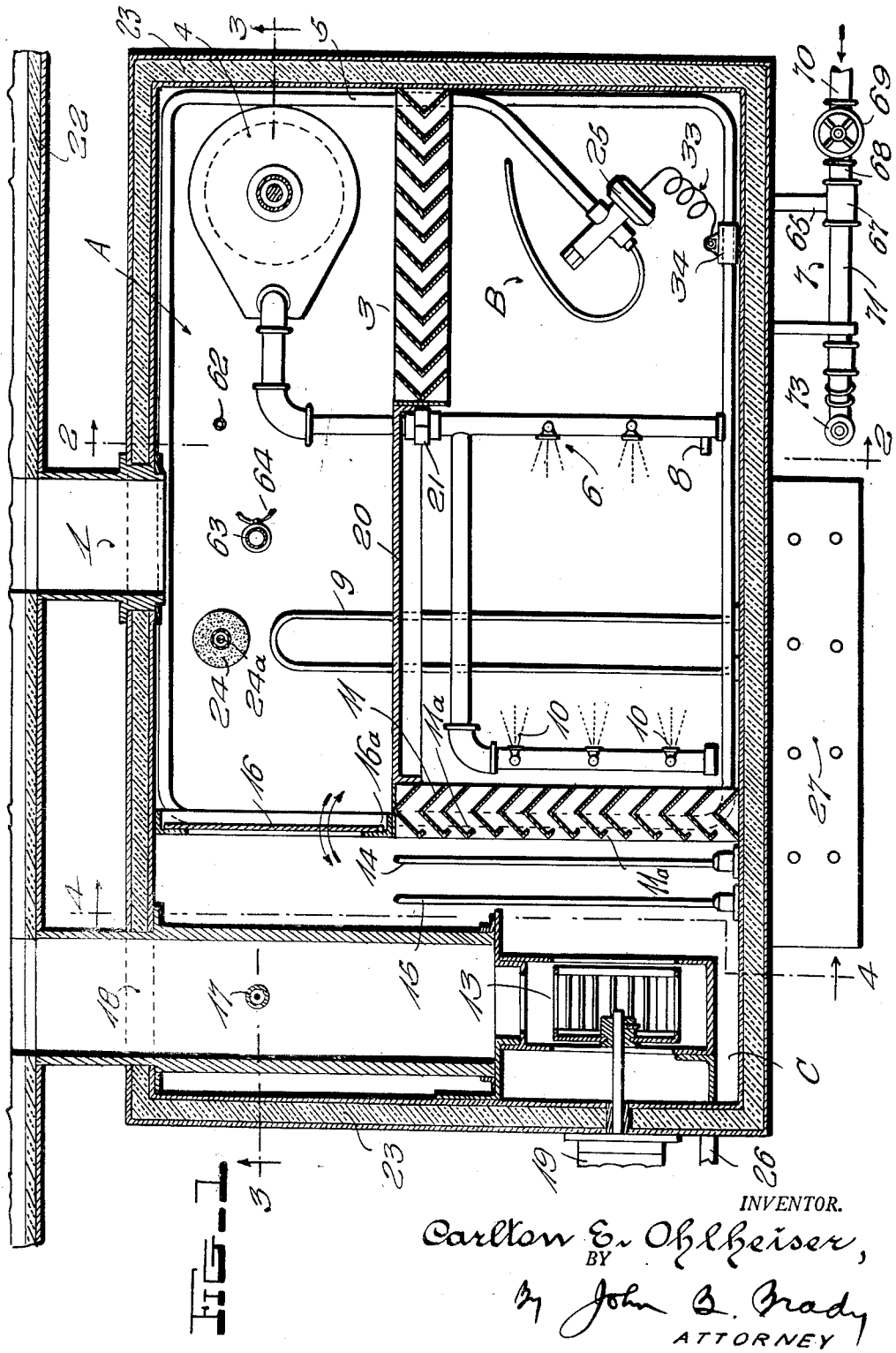

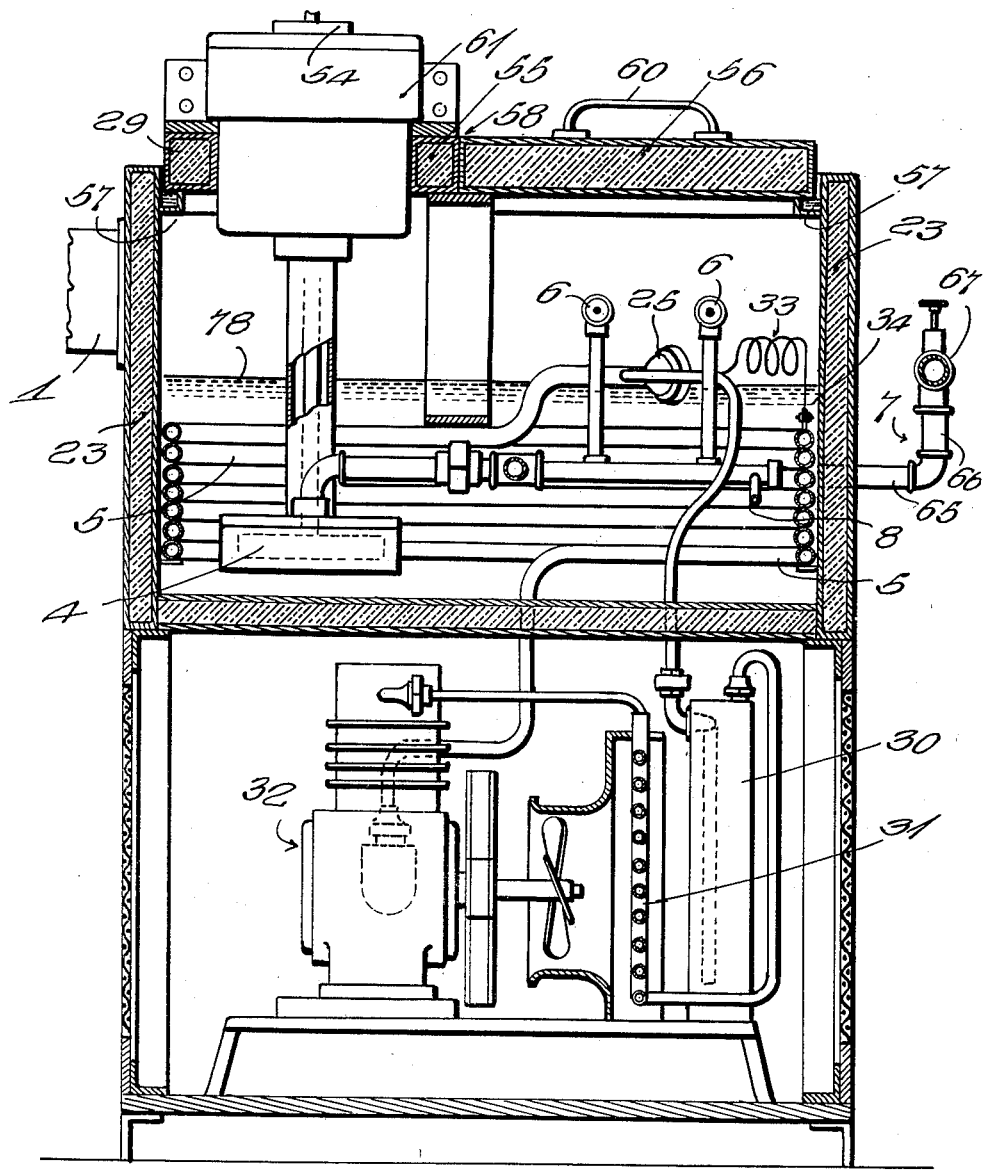

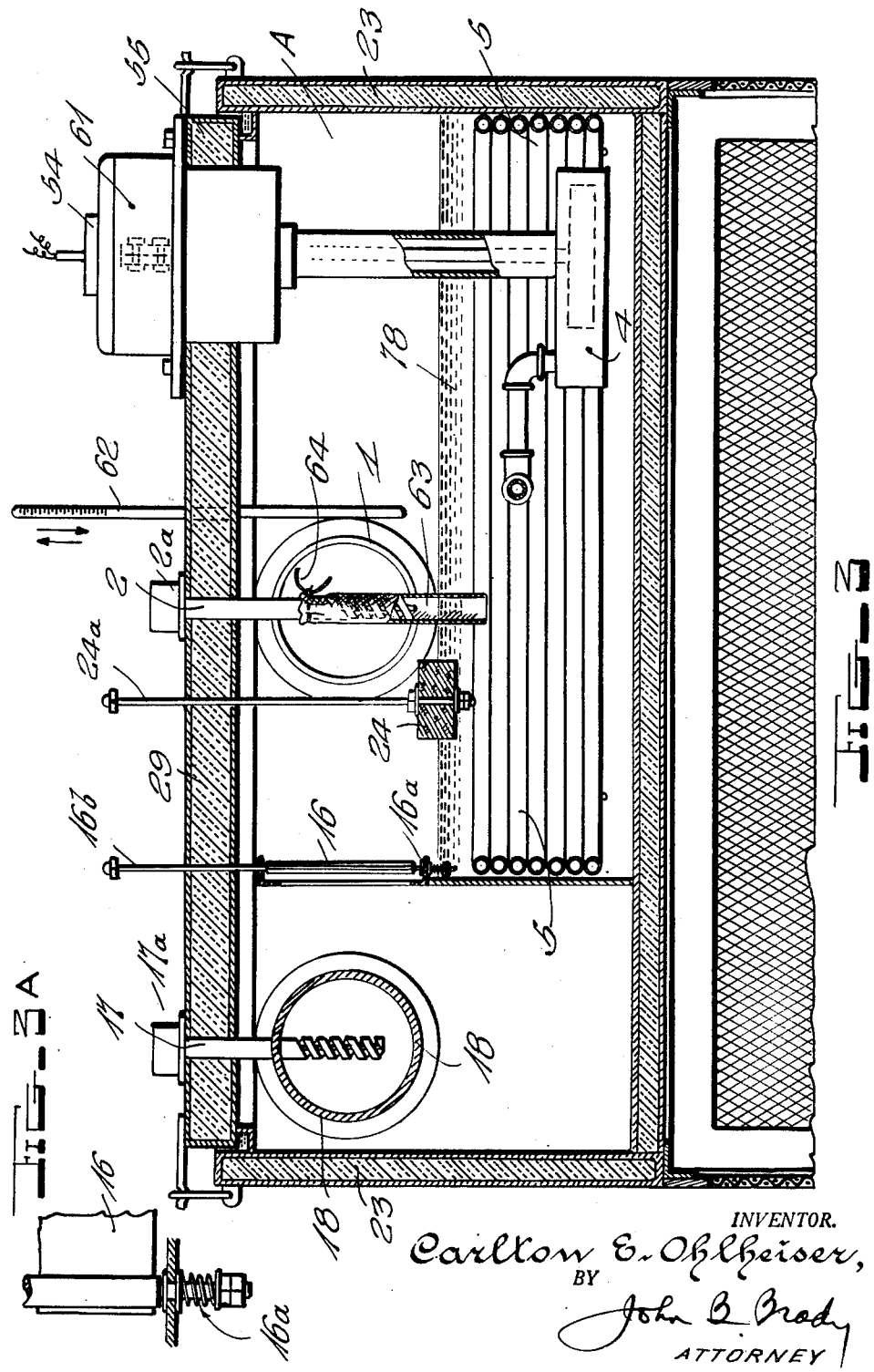

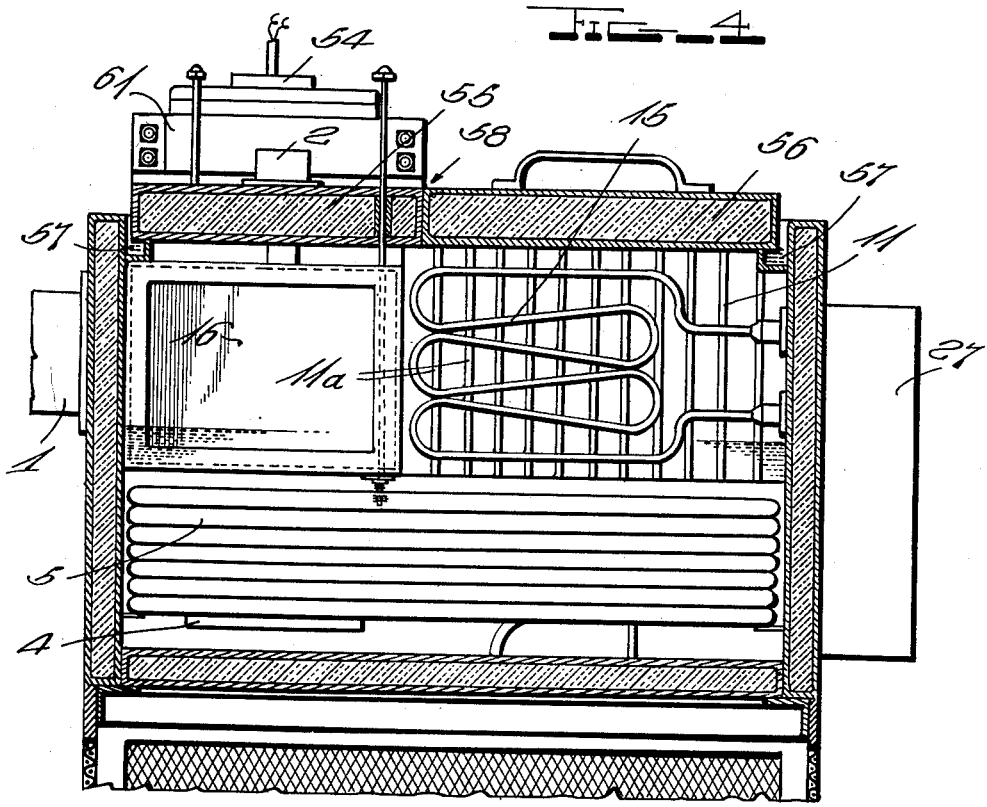
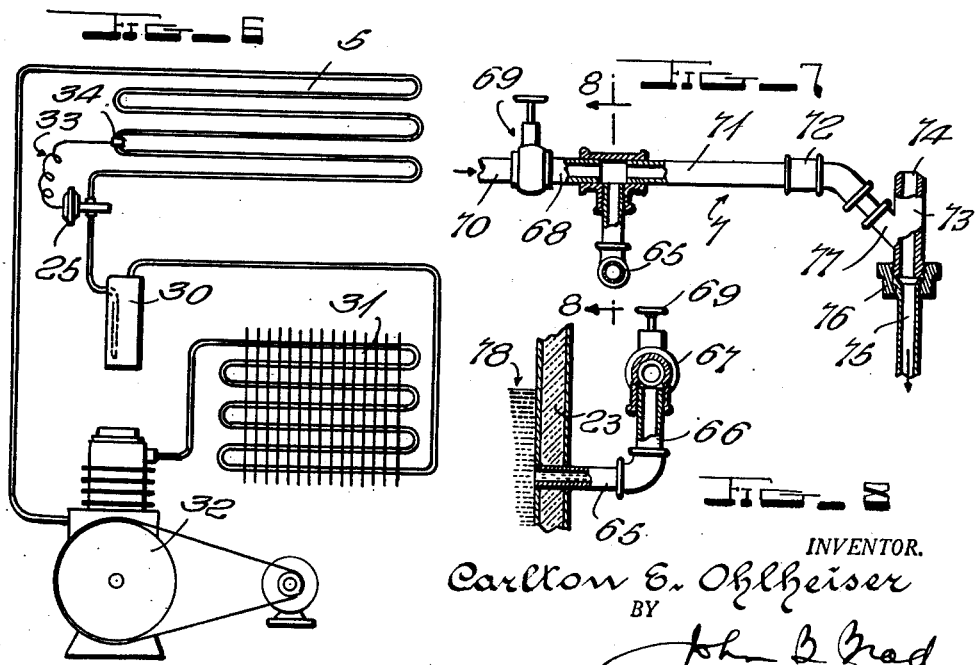

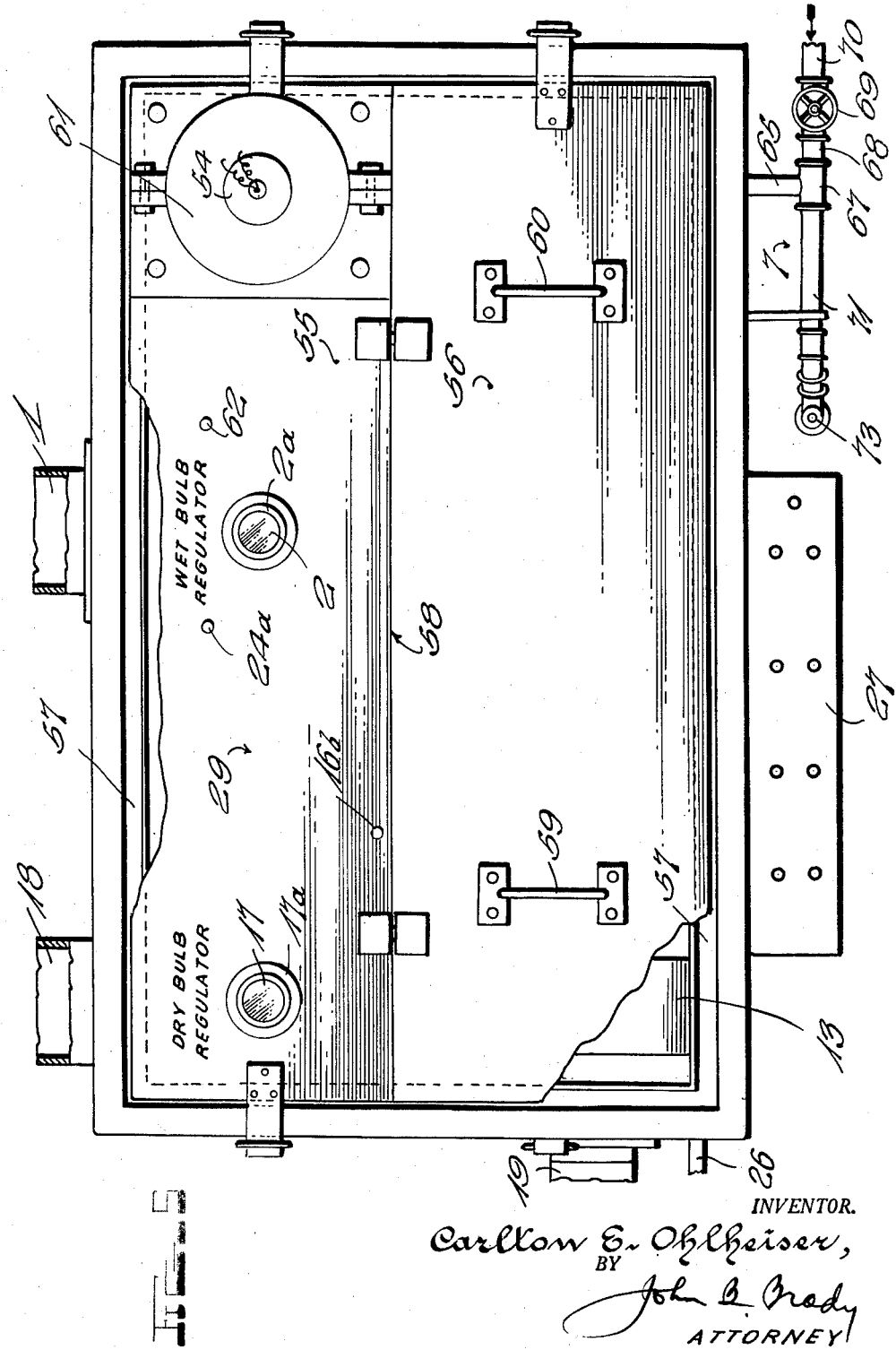

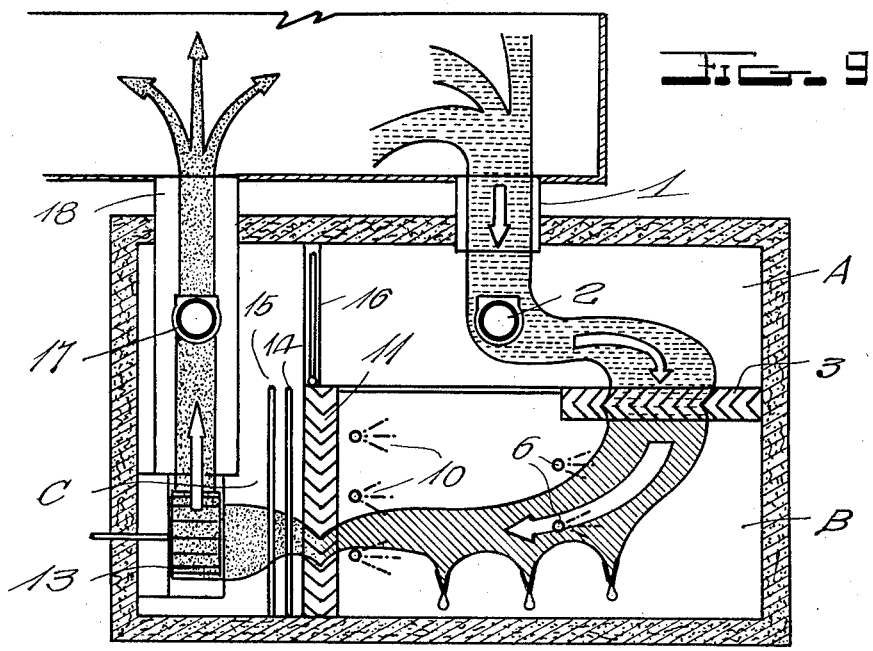
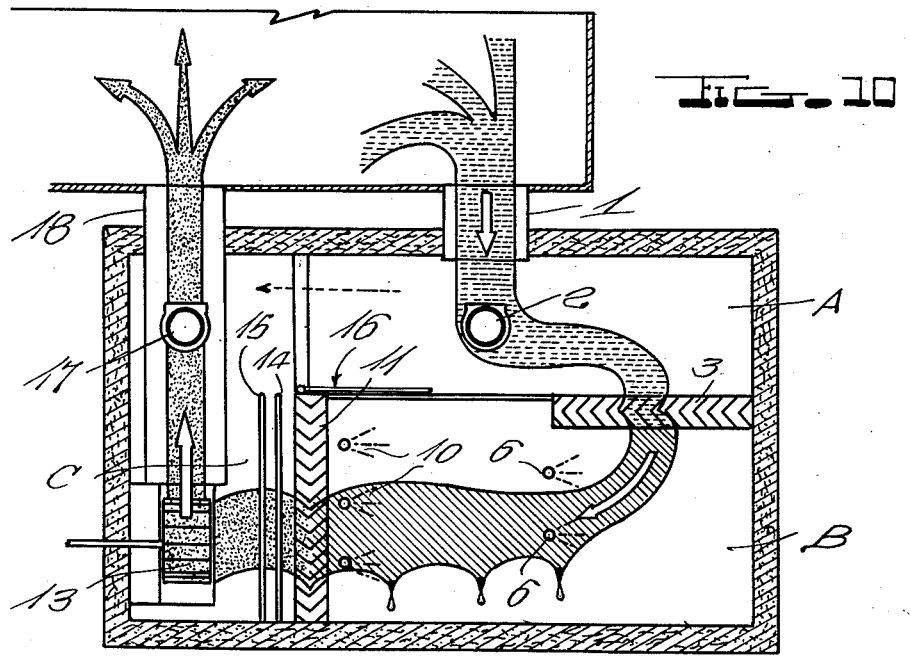

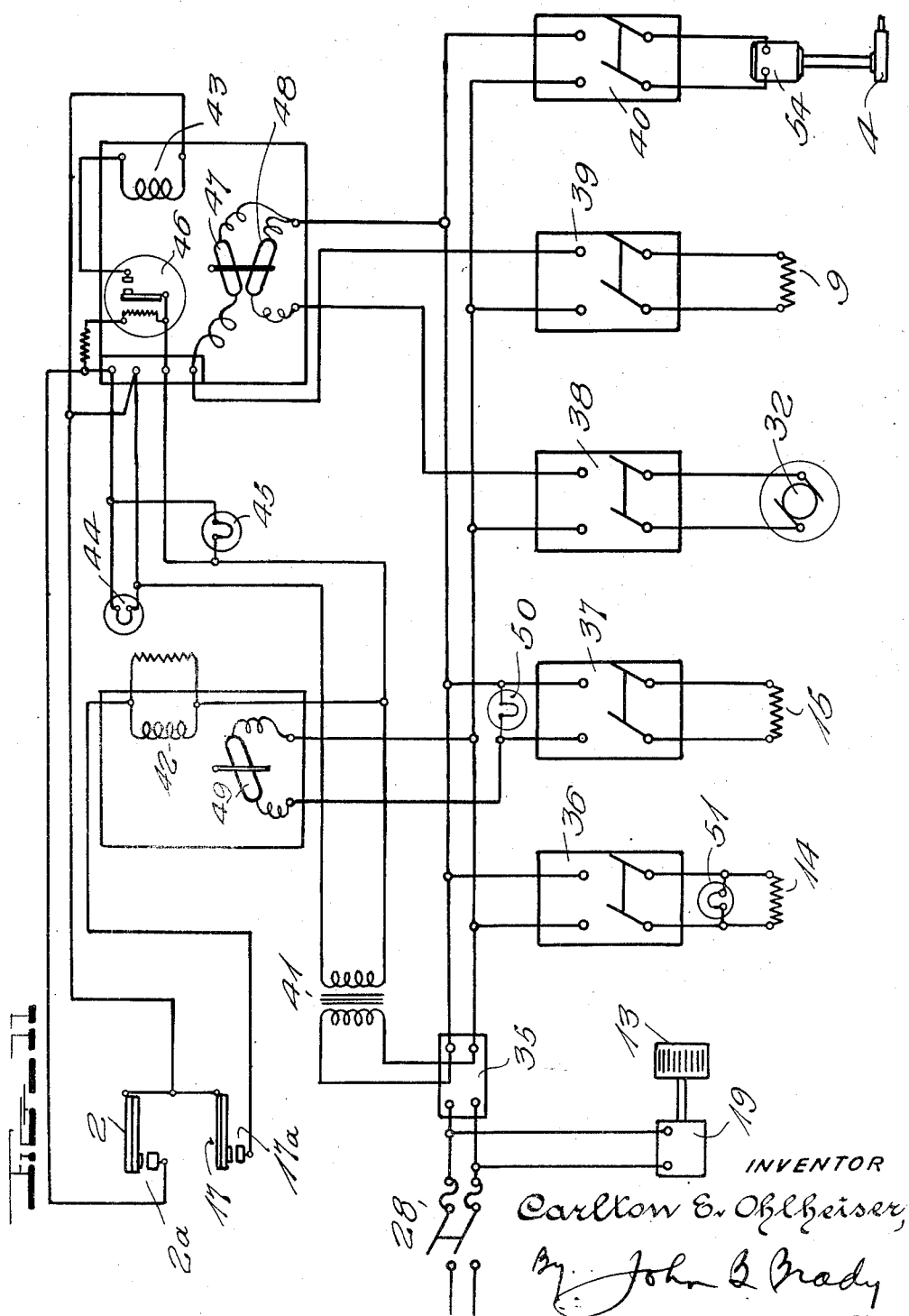

2,545,491

UNITED STATES PATENT OFFICE 2,545,491

APPARATUS FOR PRECISION CONTROL OF CLIMATIC CONDITIONS

Carlton E. Ohlheiser, Silver Spring, Md., assignor, by mesne assignments, to American Instrument Co., Inc., a corporation of Maryland Application October 25, 1945, Serial No. 624,509

6 Claims. (Cl. 257—3)

My invention relates broadly to air conditioning systems and more particularly to an improved apparatus for precisely controlling the temperature and humidity conditions of air.

One of the objects of my invention is to provide an apparatus which serves to supply a source of conditioned air precisely controlled as to temperatures and thereby controlled as to relative humidity.

Another object of my invention is to provide a construction of air conditioning equipment containing both wet bulb and dry bulb temperature regulating controls, refrigeration means, heating means, fluid atomizing means and means for forcing air to be conditioned through said atomizing means for conditioning, according to the operation of said regulating controls.

Still another object of my invention is to provide a construction of air conditioning cabinet for delivering conditioned air, containing arrangements of air deflecting means in a confined circulatory path for air through a fluid spray system, a refrigeration system, a heating system, and dry and wet bulb thermoregulator controls.

A further object of my invention is to provide a readily portable construction of air conditioner having air intake and discharge connections that may be readily established with the confined area in which the conditioned air is to be utilized, where the portable conditioner includes air and fluid mixing means, refrigeration means, refrigeration means and heating means, all controlled by action of dry and wet bulb thermoregulators for insuring constant condition of the air discharged to the conditioned area.

Other and further objects of my invention reside in the improved construction of climatic conditioner and air washer for reproducing in similitude actual temperature and humidity conditions existent in various geographical areas as set forth more fully in the specification hereinafter following by reference to the accompanying drawings, in which:

Figure 1 is a horizontal sectional view through the air conditioning apparatus of my invention illustrating the association of the air intake chamber, spray chamber, and air discharge chamber; Fig. 2 is a vertical transverse sectional view through the air conditioner taken substantially on line 2—2 of Figure 1; Fig. 3 is a fragmentary vertical longitudinal sectional view through the upper section of the air conditioner taken substantially on line 3—3 of Figure 1; Fig. 3a is an enlarged detail fragmentary view showing the manner of mounting the air velocity valve; Fig. 4 in vertical transverse view taken substantially on line 4—4 of Figure 1; Fig. 5 is a top plan view of the air conditioning apparatus with portions thereof broken away as illustrated in section; Fig. 6 is a diagrammatic view of the arrangement of the refrigeration apparatus in the air conditioning system of my invention; Fig. 7 is a fragmentary view illustrating the connections of the water supply system to the liquid level device with which the air conditioning apparatus is designed to operate; Fig. 8 is a view of the pipe connections taken substantially on line 8—8 of Fig. 7; Fig. 9 is a theoretical view showing the flow of air through the air conditioner for producing a predetermined condition of the air in the work space; Fig. 10 is a theoretical diagram showing the change in flow for securing another set of predetermined conditions; and Fig. 11 is a wiring diagram showing the electrical circuit connections of the various control means used in the air conditioning system of my invention.

My invention is directed to a construction of portable apparatus comprising a source of conditioned air, precisely controlled as to temperature and humidity. The control unit is readily connectible to a work chamber in which the conditioned air is to be utilized. By use of the apparatus of my invention, a manufacturer in New York, for example, can simulate Brazilian weather in his plant for thus testing manufactured products under the conditions to be encountered in such areas. Air conditions established by the control unit can duplicate the average summer or winter temperature and corresponding humidities in most of the countries of the world. The area wherein temperatures can be duplicated by the apparatus of my invention comprises approximately three-fourths of the geographical space included between the Arctic Circle and the Antarctic Circle. All summer temperatures encountered between the latitude of southern Canada and nearly the southern tip of South America can be produced. The winter conditions reproducible in the apparatus of my invention extend from the latitude of the Gulf of Mexico to that of central Paraguay in South America. Five exceptions exist: desert areas in Saudi Arabia, Africa, midwestern U. S., central Australia, and western China. Available data indicates no other large areas of similar climatic character.

The air conditioning apparatus of my invention has wide scope of use, among which are:

1. For production and control a. Control temperatures and humidities for penicillin mold growth.
b. Checking production samples of plastic for moisture resistance at specific humidities.
c. Making tropical climates in the manufacturer's plant in which to test all types of communication equipment.
d. Testing food packaging for moisture absorption resistance.
e. Measuring weight changes in paper samples at various humidities.
f. Wood moisture content control in sampling techniques.
g. Assembly of precision apparatus in a controlled atmosphere.
h. Any process requiring precise control of dry or wet bulb temperatures and humidities.

2. From the field of pure research a. In medical research, breeding and supplying normal living conditions for tropical insects such as malarial mosquitoes.
b. Raising fungi and molds of many for determination of effect on human life.
c. Experimental investigation into chemical changes of many synthetic materials when exposed to wide ranges of temperature and humidities.
d. Experimental determination of ideal conditions for production of certain explosives.
e. Agricultural experiments in seed germination and storage.
f. Investigation of decomposition of organic materials at higher temperatures and humidities.
g. Any type of experimentation needing precise temperature control and humidity maintenance.

The conditioning or control unit is provided with air inlet and discharge connections that may be established to an insulated cabinet. The work chamber must be of such quality that it will not appreciably leak air or moisture vapor and of such construction that the insulation space in it will not become saturated with moisture by infiltration. Connection of the air conditioner to any work space is easily accomplished by means of two plastic coupling tubes supplied as part of the unit of my invention.

The size of the unit is dependent upon the size and construction of the work chamber to which it is applied. As a guide however, the following chart shows the capacity of one particular unit when operated on a chosen, well made, carefully insulated and sealed cabinet, of 20 cubic foot capacity. This chart will apply only when the ambient temperatures are within the range 70 deg. F. to 90 deg. F., dry bulb reading.

Some available working conditions (upper and lower limits given):

40 deg. F. dry bulb, 40 deg. F. wet bulb, 100% R. H.
40 deg. F. dry bulb, 39 deg. F. wet bulb, 93% R. H.
120 deg. F. dry bulb, 118 deg. F. wet bulb, 95% R. H.
120 deg. F. dry bulb, 84 deg. F. wet bulb, 23% R. H.

The result of an ambient temperature which exceeds the above 20 range is to bring the two working limits closer together, that is to reduce the available working range. The above indicated ranges may be extended by increasing the capacity of the refrigeration and/or heating equipment as desired.

The apparatus of my invention offers a wide range of dry bulb temperature conditioned air. The conditioner will supply air controlled to a precision of ±¼° F., or better between dry bulb temperatures of plus 40° F. and plus 120° F., or greater measured at the discharge of the control unit.

It will control the air discharge at any humidity between 92% and 100% at 40° F. dry bulb or between 22% and 98% at 120° F. dry bulb.

Extreme sensitivity and immediate response of the humidity controlling portion of this device are gained by using a precision type sensitive thermoregulator as a wet bulb thermometer. Such sensitive thermoregulators are described in detail in copending applications by Nathan Morris, Serial No. 534,315, filed May 5, 1944, for Thermostatic Regulator, now Patent No. 2,424,250 of July 22, 1947, and Sidney Healey, Serial No. 534,329, filed May 5, 1944, for Thermostatic Regulator, now Patent No. 2,435,004 of January 27, 1948. The sensitive temperature responsive element is surrounded by a wetted wick and thus regulates wet bulb temperatures.

A quiet balanced fan supplies an ample amount of air circulation to maintain excellent uniformity of conditions in the work space. The pressure characteristics of the fan allow the use of short, well insulated ducts to carry the air to a point some distance from the control unit.

It is only necessary to set the wet and dry bulb thermoregulators to the temperatures required to secure the desired humidity and then turn on the proper switches. No messy chemical solutions are required to be mixed or to occupy the work space in order to maintain desired air and temperature conditions.

Referring to the drawings in detail the air conditioning equipment is illustrated comprising upper and lower sections, the upper section of which includes the air intake compartment A, the spray compartment B and the air discharge compartment C, and the lower section of which includes the refrigeration unit, as shown in Fig. 2. The cabinet which houses the air conditioning apparatus may be mounted on rollers to allow the cabinet to be readily positioned adjacent the work chamber with which the cabinet is to be associated. I provide an inlet connection 1 and an outlet connection 18 between the work chamber and the air conditioning cabinet. In line with the inlet connection 1 and within the air intake compartment A I provide the wet bulb thermoregulator 2 around which the incoming air currents pass in their path of travel. Intermediate the air intake compartment A and the spray compartment B I provide an inlet spray eliminator 3 comprising a multiplicity of parallel extending louvres or air directors each formed on angles of approximately 90 degrees for abruptly changing the direction of the air as it passes from the air intake compartment A into the spray compartment B.

The air intake compartment A also includes a water pump 4 disposed vertically therein and normally submerged in the water which accumulates in the bottom of the upper section for developing a pressure head for feeding the spray nozzles and stirring jet within the spray compartment B.

The lower portion of the upper section of the air conditioning equipment is provided with a refrigeration coil 5 the turns of which are compactly arranged around the inner wall of the lower portion of the air intake compartment A and spray compartment B and connected to the refrigeration unit in the lower section of the apparatus. The refrigeration coil 5 is normally submerged by the accumulated spray water, the level of which is automatically maintained by water level device 7. Water is distributed under the pressure head developed by the water pump 4 through a pipe system which contains successive stages of spray nozzles one of which is represented at 6 and another of which is represented at 10 connected through a pipe system with the pump 4. The first stage spray nozzles 6 are alternately positioned with respect to succeeding stage spray nozzles 10, all being supplied from the common water pump system 4. The water distribution system also includes a submerged jet 8 which serves as a stirring jet beneath the accumulated pool of water in the base of the spray chamber for insuring the uniform temperature throughout the entire pool. The pool of water is maintained at proper temperature by means of the immersion heater 9 which is submerged in the water and electrically connected to the power circuit under control of the wet bulb thermoregulator and/or refrigeration coil 5.

The air passing from the spray compartment B into the air discharge compartment C passes through a spray eliminator represented at 11 formed by a plurality of parallel extending louvres. The louvres 11 are formed from sheetlike members arranged in planes at substantial right angles to each other and terminating in edge portions 11a extending at approximately right angles to the plane of one of the plane portions of the louvres and serving as a moisture collecting and draining means for removing all traces of water particles from the outgoing air.

An air circulating fan 13 is arranged in the air discharge compartment C. The air circulating fan 13 is arranged in a housing within the air discharge compartment C and is driven by a motor 19 located outside of the insulated wall of the conditioner.

There are two air heaters 14 and 15 disposed between louvres 11 and the air circulating fan 13. Both air heaters are mounted and arranged in a position to release the maximum amount of heat to the air.

Heater 14 is arranged in the circuit for manual control. Heater 15 is controlled by the dry bulb thermoregulator.

Intermediate the air discharge compartment C and the air intake compartment A, I provide a damper or valve 16 which swings about a pivot represented at 16a for opening a path for air directly from the air intake compartment A to the air discharge compartment C for bypassing the air around the spray compartment B. The valve when open allows air to pass directly from the air intake compartment A to air discharge compartment C according to the dotted line arrow and when closed the air flow takes place from the air intake compartment A through spray eliminator 3, spray compartment B, and spray eliminator 11 according to the solid line arrow. The dotted line arrow indicates the path of the air with the damper or valve 16 open whereas the solid line arrow indicates the path for the air with the damper 16 closed.

The dry bulb temperature controller or thermoregulator 17 is mounted in the air discharge compartment C with its sensitive element extending down into the air outlet tube 18 to contact the conditioned air. The air outlet tube 18 is provided with a suitable connecting sleeve extending into the work chamber of the unit with which the conditioner of my invention is associated.

The air intake compartment A and spray compartment B are separated by partition wall 20 which extends from inlet spray eliminator 3 at one end to outlet spray eliminator 11 at the other end and forms one side wall for the air duct which guides air from the inlet connection 1 either through the inlet spray eliminator 3 under conditions of high pressure head in which the air circulates through spray chamber 3 or under conditions of low pressure head when the air circulates directly from intake compartment A to discharge compartment C.

The arrangement of piping within the conditioner is such that maintenance and repair are facilitated. For example, a union 21 is provided in the water supply line from the pump 4 to the pipe distribution system that carries spraying nozzles 6 and 10. Thus the pipe distribution system may be readily disconnected from the pump 4 or reassembled with respect to the connection to the pump 4 through the union 21. Other conveniences in piping are arranged in the water connections and drain connections exterior to the conditioner.

The work chamber with which the conditioner is associated is illustrated as having a suitable well structure of heat insulation material 22 forming part of the work chamber. Similarly, the air conditioner has a wall structure of suitable heat insulation material represented at 23.

A float level indicator represented at 24 is provided in a suitable position in the air intake compartment A with a suitable indicating rod 24a extending vertically therefrom and through the top 29 of the conditioner, for indicating by the extent of projection thereof the proper level of water in the control unit and showing whether the water level device is operating properly.

The refrigeration system for the conditioner includes a refrigeration expansion valve 25 between the refrigeration coil 5 and the receiver 30 which connects through condenser 31 to the compressor 32 of the refrigeration apparatus as schematically illustrated in Fig. 6. The thermostatically controlled expansion valve 25 includes a temperature controlled element 33 which is clamped at 34 to one of the convolutions of the refrigeration coil 5 so that the temperature of the refrigeration coil 5 directly controls the functioning of the expansion valve 25 for controlling the refrigeration system.

In order to maintain continuous operation of the conditioner a suitable drainage must be provided and I have indicated this by pipe line 26 disposed at a predetermined height in the side wall of the fluid chamber so that the water level does not exceed a predetermined level.

All of the electrical controls for the conditioner are mounted within a control box indicated at 27 containing all electrical equipment used for the control system such as switches and pilot lights and control relays as diagrammatically shown more clearly in Fig. 11.

The main line switch 28 is properly fused as shown in Fig. 11 and is also contained within control box 27.

In Fig. 11 I have shown the power supply circuit connected through line switch 28 and suitable fuses to the fan driving motor 19 for driving the circulating fan 13. The line circuit connects terminal block 35 from which connections are taken to each of the control switches illustrated at 36, 37, 38, 39 and 40 and to the transformer 41 which supplies energy to the thermostat control circuit. I have represented the thermostat control circuit schematically as including the dry bulb regulator contacts 17a of dry bulb temperature controller 17 connected to the control winding 42 and to control winding 43 of the control apparatus as illustrated and wet bulb regulator contacts 2a of wet bulb temperature controller 2 connected to control winding 43 of the control apparatus. The circuits controlled by the thermostatic regulators include pilot lights 44 and 45 which indicate the condition of operation of the regulators. A time delay circuit controller 46 is arranged in the control circuit as shown. Switch devices represented at 47 and 48 are controlled by control winding 43 while switch device 49 is controlled by control winding 42. Pilot light 50 indicates the actuated or unactuated condition of switch device 49, according to the energized or deenergized condition thereof.

The circuits connected to switches 36, 37, 38, 39 and 40 extend to the several operating elements in the conditioner as heretofore described. Switch 36 connects the power supply to the continuous dry bulb heater 14 with a suitable pilot light 51 in circuit therewith. All of the pilot lights heretofore described, that is, 44, 45, 50 and 51 are arranged in the control box 27 and indicate the condition of the several circuits.

Switch 37 connects to the controlled air heater 15, under dry bulb control.

Switch 38 connects to the driving motor 32 of the refrigeration apparatus under wet bulb control through switch device 48.

Switch 39 connects to the wet bulb control heater 9 that heats the spray water under control of the circuit through switch device 47. It will be observed that control winding 43 operates switch devices 47 and 48 in opposite conditions, that is, when the circuit is open through switch device 47 and the heater 9 is deenergized, the circuit is closed through switch device 48 and refrigeration motor 32.

Switch 40 connects to the pump motor 54 that drives pump 4 for circulating and establishing the pressure head for the spray water which is atomized from the sets of nozzles 6 and 10 constituting the spray heads.

By providing the individual switches for the various controls shown in Fig. 11 a particular control function may be segregated or selected from the group of control functions.

The top cover of the upper section of the conditioner is divided into two portions represented at 55 and 56, Fig. 5, extending parallel to each other and seated within the ledge carried by the insulated wall structure 23. The space between the peripheral edges of the top cover and the ledge of the conditioner cabinet is sealed by a water seal indicated at 57. The two parts of the cover 55 and 56 are securely clamped together edge to edge to form an air-tight seal along the juncture line represented at 58. The parts of the top cover separate along the seam line 58 and the cover portion 56 may be removed by grasping the handles 59 and 60. The other portion of the cover 55 serves as a support for the motor unit 54 which is securely fastened in frame 61 with its operating shaft depending downwardly and connected to the pump 4 submerged within the fluid pool in the upper compartment. The cover 55 also serves as a support for the wet bulb thermoregulator 2 and the dry bulb thermoregulator 17, the calibrated control heads of which project above the cover 55 and are available for adjustment. The cover 55 is apertured for the passage of the float control rod 24a, the damper control rod 16b and the thermometer 62. Thermometer 62 may be frictionally retained in position in the cover 55 with the bulb thereof depending into air intake compartment A, or into the water pool below by farther downward extension.

The wet bulb thermoregulator (Fig. 3) has a wick or jacket 63 tied with a draw-string 64 about the upper portion of the helical thermoregulator element which depends downwardly into the air intake compartment A. The jacket thus formed serves by capillary attraction to draw fluid from the pool in the upper compartment.

The water level device which serves to supply water from the external water supply system to the conditioner is represented at 7, Fig. 2, as heretofore explained, and is shown more particularly in Figs. 7 and 8. In this arrangement the intake connection to the upper compartment is represented at 65 connected through the short riser 66 to the T connection 67 which connects at one end to pipe 68 in which valve 69 leading from main water supply pipe line 70 is located. The other end of the T connection 67 connects through pipe 71 to the union 72 which connects to the fitting illustrated at 73. Fitting 73 has an upwardly extending bleeder pipe 74 and a downwardly extending drain pipe 75 interconnected through coupling 76. The upwardly extending bleeder pipe 74 is connected to union 72 through Y connection 77. The bleeder pipe 74 serves as an air discharge to prevent siphoning while maintaining level of the water in the pool shown at 78 in the bottom of the spray compartment B. Thus a constant level of fluid may be maintained in the pool from which the pump 4 draws in developing a pressure head for spraying the fluid in atomized form from nozzles 6 and 10.

The wet and dry bulb temperatures of the air being circulated are shown as being measured within the air conditioner unit by the two sensitive thermoregulators. These thermoregulators may optionally be mounted in the work space. Certain controls are immediately actuated, adjusting these temperatures either upward or downward as needed. No centrifugal atomizers or spray devices need be used within the work space to maintain humidity. Thus no dripping occurs and drip pans are not required to occupy this valuable area. The necessary amount of water is automatically maintained in the control unit. No hand filling with water buckets or bottles is required.

Two examples are cited to illustrate the operation of the air washer control unit. The most common specific requirements of this unit would be:

1. Maintaining low temperatures and average absolute humidity (the number of grains of water vapor per pound of dry air), in a work space surrounded by air having a high dry bulb temperature and high absolute humidity. This situation is illustrated by Fig. 9.

2. Maintaining a high temperature and high absolute humidity in a space surrounded by air with low temperature and low absolute humidity. This case is illustrated by Fig. 10.

All equipment not essential to the explanation has been omitted from the two illustrations referred to in the foregoing numbered paragraphs (1) and (2). They present top views of the air washer coupled to a work chamber.

In these views, the arrowed shaded bend represents the direction of air flow and the shadings indicate the changes in the qualities of the air throughout each area. This air is pulled through the control unit and pushed through the work chamber by the driven pressure fan 13, shown in the lower left-hand corner of both diagrams.

*Discussion of case 1*

(Maintaining temperatures below room and removing moisture from the controlled air.)

Referring to Fig. 9 it may be assumed that the conditioning unit and work chamber are assembled and installed in a room where the average air qualities for that climate are:

95° F. dry bulb temperature
75° F. wet bulb temperature
100 grains $H_2O$/# dry air
38% relative humidity The controls of the unit are set to maintain air qualities as follows, and this condition has been attained:

80° F. dry bulb temperature
67° F. wet bulb temperature
60° F. dew point temperature
77 grains $H_2O$/# dry air
50% relative humidity Furthermore, suppose the operator now opens the door to the work chamber, inserts material for test, and closes the door again. Some of the hotter room air is swept into the work chamber, mixed with the controlled air and causes a new set of air conditions, measured at the inlet to the conditioning unit. They are:

81° F. dry bulb temperature
69° F. wet bulb temperature
61° F. dew point temperature
80 grains of $H_2O$/# of dry air Upon entering the conditioning unit, this air strikes the wet bulb regulator element. This regulator, set to maintain 67° F. wet bulb temperature responds to 69° F. wet bulb temperature by turning on the refrigeration machine. The resulting refrigeration applied to the spray water cools it to 56° F.

By experiment it has been found that when a fine spray of water is applied to air in an enclosure such as a carefully designed air washer, the discharged air is cooled to nearly the same dew point temperature as the spray water and is nearly saturated with moisture at its discharge temperature.

In this case the air is chilled to a dew point temperature of 60° F. and at saturation or 100% relative humidity holds 77 grains of moisture per pound of dry air. Since the dew point temperature has been lowered from 61° F. to 60° F. the air has lost some of its moisture by condensation. (By definition; the dew point temperature is that temperature at which air being cooled, first begins to lose its water vapor by condensation to liquid.) Comparing the absolute humidities gives the loss as (80 grains minus 77 grains) equal to 3 grains.

The air now leaves the spray chamber by making two 90 degree turns while passing through the outlet air eliminator. Any water droplets remaining in the air stream are thrown out against the eliminator and become part of the spray water.

Next the air passes through the reheaters, which are momentarily "off." It is drawn into the fan and shot out the discharge tube where it contacts the extremely sensitive dry bulb regulator element. This regulator, set to maintain 80° F. is quickly affected by the 60° F. air leaving the fan and immediately turns on the air reheaters at the entrance to the fan. As a result, the air entering the fan is heated until it measures 80° F. then the heaters are turned off. Because of the extremely high speed of air travel, no appreciable time lag can occur in this control. The location of the dry bulb regulator adjacent to the work chamber insures that all air entering this space will be held at precisely the temperatures desired.

While raising the dry bulb temperature of the air leaving the control unit from 60° to 80° F., the wet bulb temperature automatically changes from 60° to 67° F. This is true since the moisture content of the air is not changed after leaving the spray chamber.

Therefore the desired conditions are again attained. These were:

80° F. dry bulb temperature
67° F. wet bulb temperature
60° F. dew point temperature
77 grains of $H_2O$/# of dry air

*Discussion of case 2*

(Maintaining temperatures above room temperatures and adding moisture to the controlled air.)

Referring to Fig. 10 the same assumptions that were made in case 1 are made in this discussion. The conditioning unit has been installed in a room where exterior temperatures average:

60° F. dry bulb temperature
55° F. wet bulb temperature
57 grains $H_2O$/# dry air
51.5° F. dew point
75% relative humidity Control temperatures are selected and the air in work space is already controlled at the following conditions:

90° F. dry bulb temperature
83° F. wet bulb temperature
81° F. dew point temperature
160 grains $H_2O$/# dry air
75% relative humidity After placing specimen in the work chamber and closing the door, the temperatures of the mixture of room air and controlled air are:

80° F. dry bulb temperature
70° F. wet bulb temperature
65° F. dew point temperature
92 grains $H_2O$/# dry air
60% relative humidity This mixture contacts the wet bulb regulator, previously set to hold a wet bulb temperature of 83° F. The wet bulb regulator turns on a heater submerged in the spray water. This heater warms the spray water to a temperature of approximately 85° F. When sprayed into the cooler incoming air mixture the air is warmed to a dew point temperature of 81° F. and saturated with water vapor at this temperature. The air conditions just before leaving the spray chamber are now:

81° F. dry bulb temperature
81° F. wet bulb temperature
81° F. dew point temperature
100% relative humidity
160 grains of moisture/# dry air As in case 1 this air passes out the fan discharge and contacts the dry bulb regulator, previously set to maintain 90° F. dry bulb. When the cooler air reaches this point, the dry bulb regulator turns on the air heaters warming it up until 90° F. is reached, and the desired air conditions have been reached as follows:

90° F. dry bulb
83° F. wet bulb
160 grains H₂O/# air
75% relative humidity

The wet bulb temperature is also raised to the desired 83° F. automatically while raising the dry bulb temperature.

Regulation has again been established at the desired working conditions of:

90° F. dry bulb
83° F. wet bulb
81° F. dew point
160 grains H₂O/# air
75% relative humidity Thus it would be seen that accurate conditions of temperature and humidity may be produced by presetting of the several functional controls of the apparatus of my invention.

The valve 16 when set to open position, as in Fig. 10, permits air to pass directly from the air intake compartment A to the air discharge compartment C, whereas when the valve 16 is set to closed position, as in Fig. 9, the air flow is forced to follow a path from the air intake compartment A through the spray eliminator 3, spray compartment B and spray eliminator 11 for imparting the required temperative humidity to the air.

I have illustrated in Fig. 3 of the drawings an arrangement of the wet bulb thermoregulator as having a wick or jacket 63 depending from the temperature-sensitive element into the fluid 78. As an alternative method of operating the wet bulb thermoregulator I may extend the temperature-sensitive element directly into contact with the fluid 78 by submergence of the temperature-sensitive element in fluid 78 without the interposition of the wick or jacket 63. I desire that it be understood that either method may be employed. The method illustrated in Fig. 3, which employs the interposed wick or jacket, results in more sensitive and accurate control, while the direct contact method results in a coarser control but both methods have proven highly practicable and successful in operation in the functioning of the method and apparatus of my invention.

While I have described my invention in certain preferred embodiments I desire that it be understood that modifications may be made and no limitations upon my invention are intended other than may be imposed by the scope of the appended claims.

What I claim as new and desire to secure by Letters Patent of the United States is as follows:

1. A source of conditioned air comprising a cabinet structure, a refrigeration unit carried thereby, a tank structure, louvred partition members extending substantially normal to each other and dividing said tank structure into an air intake section, an air humidifying section, and an air discharge section, means in said air discharge section for establishing a pressure head for drawing air to be conditioned through said air intake section, said humidifying section and through said air discharge section, a water spray system in said humidifying section, a reservoir in the base of said air intake section for receiving the water discharged by said water spray system, an air heater in said air discharge section, a thermoregulator in said air intake section and a dry bulb thermoregulator in said air discharge section, and means operated by said thermoregulators according to temperature and/or humidity conditions for controlling the operation of said water spray system and said air heater.

2. An air conditioner comprising a cabinet, partition members extending substantially normal to each other and dividing said cabinet into an air intake chamber, a spray chamber, and an air discharge chamber, an air inlet connection for said air intake chamber, a tank in the bottom of said air intake chamber for accumulating fluid discharged from said spray chamber, an air discharge connection for said air discharge chamber, louvres disposed in each of said partition members, means in said air discharge chamber for developing a pressure head for normally drawing air from said air inlet connection through said air intake chamber, said spray chamber and through said air discharge chamber to said air discharge connection, a valve between said air intake chamber and said air discharge chamber for by-passing the air from said air inlet connection to said air discharge connection without passing through said spray chamber, a temperature sensitive device located in said air intake chamber and subject to temperature conditions of the fluid accumulated in said tank from the spray chamber, condition affecting means responsive to said device whereby the condition affecting means control the temperature of the fluid in the tank and a separate temperature sensitive device in said air discharge chamber for controlling the operation of other condition affecting means and correspondingly controlling the temperature of the air.

3. An air conditioner comprising a cabinet, partition members extending substantially normal to each other and dividing said cabinet into an air intake chamber, a spray chamber and an air discharge chamber, an air inlet connection for said air intake chamber, an air discharge connection for said air discharge chamber, louvres disposed in each of said partition members, means in said air discharge chamber for developing a pressure head for normally drawing air from said air inlet connection through said air intake chamber, said spray chamber and through said air discharge chamber to said air discharge connection, a tank in the base of said air intake chamber for accumulating spray water therein as discharged from said spray chamber, a manually operated valve for diverting the passage of air from said air intake chamber directly to said air discharge chamber without passing through said spray chamber, a temperature controlled regulator subject to the temperature of the spray water accumulated in said tank, a condition affecting means controlled by said regulator for controlling the temperature of the water accumulated therein, a separate temperature controlled regulator subject to the air in said air discharge chamber and a separate condition affecting means controlled by said last mentioned regulator for controlling the temperature in said air discharge chamber, and means for circulating the water accumulated in said tank through said spray chamber.

4. An air conditioner comprising a cabinet, partition members extending substantially normal to each other and dividing said cabinet into an air intake chamber, a spray chamber, and an air discharge chamber, an air inlet connection for said air intake chamber, an air discharge connection for said air discharge chamber, louvres disposed in each of said partition members, means in said air discharge chamber for developing a pressure head for normally drawing air from said air inlet connection through said air intake chamber, said spray chamber and through said air discharge chamber to said air discharge connection, a tank in the base of said air intake chamber for accumulating spray water therein as discharged from said spray chamber, a pump submerged in the accumulated spray water for force flowing the spray water through said spray chamber, a valve between said air intake chamber and said air discharge chamber for by-passing the air from said air inlet connection to said air discharge connection without passing through said spray chamber, and separate thermoregulators disposed in said air intake and discharge chambers respectively and coacting to control condition affecting means and correspondingly control temperature conditions in said spray chamber for conditioning the air during the passage thereof from said air intake connection to said air discharge connection, the thermoregulator in said air intake chamber being subject to the temperature conditions of the spray water accumulated in said tank.

5. An air conditioner comprising a cabinet, partition members extending substantially normal to each other and dividing said cabinet into an air intake chamber, a spray chamber, and an air discharge chamber, an air inlet connection for said air intake chamber, an air discharge connection for said air discharge chamber, louvres disposed in each of said partition members, means in said air discharge chamber for developing a pressure head for normally drawing air from said air inlet connection through said air intake chamber, said spray chamber and through said air discharge chamber to said air discharge connection, a tank in the base of said air intake chamber for accumulating spray water therein as discharged from said spray chamber, a pump submerged in the accumulated spray water for force flowing the spray water through said spray chamber, a valve between said air intake chamber and said air discharge chamber for by-passing the air from said air inlet connection to said air discharge connection without passing through said spray chamber, heating means disposed in said tank, separate heating means disposed in said air discharge chamber, refrigerating means disposed in said spray chamber, and separate thermoregulators disposed respectively in said air intake chamber and said air discharge chamber and coacting to control the aforesaid means and the temperature conditions in each of said chambers, the excitation of said heating means, and the operation of said refrigerating means, for conditioning the air passing from said air inlet connection to said air discharge connection the thermoregulator in said air intake chamber being subject to the temperature conditions of the spray water accumulated in said tank.

6. An air conditioner comprising a cabinet, partition members extending substantially normal to each other and dividing said cabinet into an air intake chamber, a spray chamber, and an air discharge chamber, an air inlet connection for said air intake chamber, an air discharge connection for said air discharge chamber, louvres disposed in each of said partition members, means in said air discharge chamber for developing a pressure head for normally drawing air from said air inlet connection through said air intake chamber, said spray chamber and through said air discharge chamber to said air discharge connection, a valve between said air intake chamber and said air discharge chamber for by-passing the air from said air inlet connection to said air discharge connection without passing through said spray chamber, said spray chamber and said air intake chamber including a tank in the base thereof, a multiplicity of spray heads disposed in said spray chamber and a pump disposed in said tank for forcing water through said spray heads in said spray chamber in a controlled cycle, heating means disposed in said spray chamber, separate heating means disposed in said air discharge chamber, refrigerating means disposed in said spray chamber, and separate thermoregulators disposed respectively in said air intake chamber and said air discharge chamber and coacting to control the operation of said pump, the excitation of each of said heating means, and the operation of said refrigerating means, for conditioning the air passing from said air inlet connection to said air discharge connection, the thermoregulator in said air intake chamber being subject to the temperature conditions of the spray water accumulated in said tank.

CARLTON E. OHLHEISER.

REFERENCES CITED

The following references are of record in the file of this patent:

UNITED STATES PATENTS

| Number | Name | Date |
|---|---|---|
| 908,388 | Braemer | Dec. 29, 1908 |
| 1,023,260 | Luehrs et al. | Apr. 16, 1912 |
| 1,471,112 | Ellis | Oct. 16, 1923 |
| 1,568,717 | Braemer | Jan. 5, 1926 |
| 1,840,565 | Buensod | Jan. 12, 1932 |
| 1,878,618 | Baker | Sept. 20, 1932 |
| 2,048,137 | Palmer | July 21, 1936 |
| 2,144,693 | Seid | Jan. 24, 1939 |
| 2,165,829 | Anderson | July 11, 1939 |